United States Patent
Bott et al.

(10) Patent No.: US 12,098,705 B2
(45) Date of Patent: Sep. 24, 2024

(54) METHOD FOR OPERATING A WIND POWER INSTALLATION, CONTROLLER FOR OPERATING A WIND POWER INSTALLATION, AND WIND FARM

(71) Applicant: Wobben Properties GmbH, Aurich (DE)

(72) Inventors: Stefanie Bott, Bremen (DE); Arjun Brück, Bremen (DE)

(73) Assignee: Wobben Properties GmbH, Aurich (DE)

( * ) Notice: Subject to any disclaimer, the term of this patent is extended or adjusted under 35 U.S.C. 154(b) by 215 days.

(21) Appl. No.: 17/348,329

(22) Filed: Jun. 15, 2021

(65) Prior Publication Data
US 2021/0396209 A1 Dec. 23, 2021

(30) Foreign Application Priority Data
Jun. 18, 2020 (DE) .................. 102020116072.0

(51) Int. Cl.
*F03D 7/02* (2006.01)
*F03D 7/04* (2006.01)
*F03D 9/25* (2016.01)

(52) U.S. Cl.
CPC .......... *F03D 7/0224* (2013.01); *F03D 7/048* (2013.01); *F03D 9/25* (2016.05);
(Continued)

(58) Field of Classification Search
CPC ... F03D 7/0224; F03D 7/048; F05B 2270/204
See application file for complete search history.

(56) References Cited

U.S. PATENT DOCUMENTS 8,025,476 B2 * 9/2011 Zheng ................ F03D 7/044
    415/1
10,215,159 B2 * 2/2019 Pineda Amo .......... F03D 7/026
(Continued)

FOREIGN PATENT DOCUMENTS

DE   102013203540 A1 * 9/2014 ........... F03D 7/0224
EP   1 790 851 A2    5/2007
(Continued)

OTHER PUBLICATIONS

Annoni et al., "Evaluating Wake Models for Wind Farm Control," *2014 American Control Conference (ACC)*, Institute of Electrical and Electronics Engineers, Portland, OR, Jun. 4-6, 2014, pp. 2517-2523.
(Continued)

*Primary Examiner* — Christopher R Legendre
(74) *Attorney, Agent, or Firm* — Seed IP Law Group LLP (57) ABSTRACT

A method for operating a first wind power installation comprising a rotor having a rotor blade that is adjustable with a pitch angle, which generates an electrical power and in the wake of which a second wind power installation is located in at least one wake wind direction, comprising the step of: operating the first wind power installation in a substantially wake-free normal mode with a first pitch characteristic, and operating the first wind power installation in a wake-loaded wake mode with a second pitch characteristic, wherein the first pitch characteristic represents a first profile of the pitch angle and the second pitch characteristic represents a second profile of the pitch angle as a function of the electrical power, wherein the pitch angle of the second pitch characteristic is greater than the pitch angle of the first pitch characteristic for at least one range of the electrical power. The method seeks to maximise the annual energy production of the second wind power installation while complying with constraints, such as compliance with maxi- (Continued)

mum thrust coefficients or wake-influenced turbulence intensities.

16 Claims, 6 Drawing Sheets

(52) U.S. Cl.
CPC ..... *F05B 2270/204* (2020.08); *F05B 2270/32* (2013.01); *F05B 2270/328* (2013.01); *F05B 2270/337* (2013.01); *F05B 2270/404* (2013.01)

(56) References Cited

U.S. PATENT DOCUMENTS

| | | | |
|---|---|---|---|
| 10,415,545 B2* | 9/2019 | Kjær | F03D 7/0224 |
| 11,174,837 B2 | 11/2021 | Messing et al. | |
| 2017/0074243 A1* | 3/2017 | Baba | F03D 7/0284 |
| 2017/0328348 A1 | 11/2017 | Wilson et al. | |
| 2018/0355848 A1* | 12/2018 | Wei | F03D 7/026 |
| 2021/0115900 A1* | 4/2021 | Gebraad | F03D 17/00 |
| 2021/0231103 A1* | 7/2021 | Gebraad | F03D 7/0264 |
| 2021/0396209 A1* | 12/2021 | Bott | F03D 7/048 |

FOREIGN PATENT DOCUMENTS

| | | |
|---|---|---|
| EP | 2063108 A2 | 5/2009 |
| EP | 3 587 805 A1 | 1/2020 |
| EP | 3647588 A1 | 5/2020 |
| EP | 3754179 A1 | 12/2020 |
| WO | 2017/207598 A1 | 12/2017 |
| WO | WO 2019233979 A1 | 12/2019 |

OTHER PUBLICATIONS

"Wind turbines—Part 1: Design requirements", International Standard IEC 61400-1, Third edition, Aug. 2005, 92 pages.

Office Action, dated Apr. 7, 2024, for Chinese Patent Application No. 202110666823.8. (17 pages) (with English Translation).

* cited by examiner

METHOD FOR OPERATING A WIND POWER INSTALLATION, CONTROLLER FOR OPERATING A WIND POWER INSTALLATION, AND WIND FARM

BACKGROUND

Technical Field

The invention relates to a method for operating a wind power installation, in the wake of which a second wind power installation is located in at least one wake wind direction, to a controller for operating a wind power installation, and to a wind farm comprising a first wind power installation and a second wind power installation.

Description of the Related Art

Wind power installations are well known; they generate electrical power from wind. Wind power installations usually pertain to horizontal-axis wind power installations, in which the rotor axis is aligned substantially horizontally and the rotor blades sweep a substantially vertical rotor area. In addition to a rotor arranged on a nacelle, wind power installations usually comprise a tower, on which the nacelle, with the rotor, is arranged so as to be rotatable about a substantially vertically aligned axis. The rotor usually comprises three rotor blades. The rotor blades are slender structural components that are often made of fibre-reinforced plastic.

Wind power installations are now usually not installed singly, but in combination with at least one other wind power installation, in particular with a large number of wind power installations. Such a collection of wind power installations is also called a wind farm. Wind power installations of a wind farm can influence each other. This is the case, for example, if a wind power installation is aerodynamically shadowed by another wind power installation.

Aerodynamic shadowing occurs when the downwind wind power installation is in the wind shadow of the upwind wind power installation. Such a wind shadow is also referred to as wake. A wind power installation in the wake usually does not provide the usual power for a certain wind speed. It is also often the case that the wind power installation in the wake does not or cannot attain its rated power, or only attains it later with respect to an undisturbed wind speed.

The performance of the wind farm must therefore be determined taking into account the individual performance of the wind power installations, in which case wake effects must be taken into account. For this reason, the objective is usually not to optimise the individual wind power installations singularly with regard to their performance, but to optimise the wind farm as such. The underlying optimisation problem is therefore primarily to maximise the performance of the wind farm.

In this maximisation problem, a number of boundary conditions have to be taken into account, in particular the greater loads due to increased turbulence of wind power installations in the wake of another wind power installation. In particular, the loads occurring at the wind power installations must be taken into account in such a way that they do not exceed the maximum design loads.

BRIEF SUMMARY

Provided is a method for operating a wind power installation, a controller for operating a wind power installation and a wind farm comprising a first wind power installation and a second wind power installation that may reduce or eliminate one or more of the stated disadvantages. In particular, provided are techniques that improve the electrical performance of a wind farm.

According to a first aspect, provided is a method for operating a first wind power installation comprising a rotor having a rotor blade that is adjustable with a pitch angle, which generates an electrical power and in the wake of which a second wind power installation is located in at least one wake wind direction, comprising the step of: operating the first wind power installation in a substantially wake-free normal mode with a first pitch characteristic, and operating the first wind power installation in a wake-loaded wake mode with a second pitch characteristic, wherein the first pitch characteristic represents a first profile of the pitch angle and the second pitch characteristic represents a second profile of the pitch angle as a function of the electrical power, wherein the pitch angle of the second pitch characteristic is greater than the pitch angle of the first pitch characteristic for at least one range of the electrical power.

It is therefore a particular finding of the present application that, in contrast to previous strategies, it is not the wind power installation in the wake that is operated differently, but rather the wind power installation causing the wake. The method therefore makes it possible to maximise the annual energy production of the second wind power installation, in particular while complying with constraints, such as compliance with maximum thrust coefficients or wake-influenced turbulence intensities.

The second wind power installation is located in the wake of the first wind power installation when the wind is blowing from the at least one wake wind direction. Preferably, the wake wind direction is defined as a wind direction range, for example a wind direction range that includes about 15 degrees, which may be dependent on the model used. The wake is characterized in particular by the fact that the second wind power installation is aerodynamically affected, in particular shadowed, by the first wind power installation.

The second wind power installation is therefore located in the wake of the first wind power installation when the wind is blowing from the at least one wake wind direction. If the second wind power installation is in the wake of the first wind power installation, the aerodynamic conditions at the second wind power installation are changed compared to a flow situation that is not affected by the first wind power installation. If the second wind power installation is substantially not in the wake of the first wind power installation, this state is referred to as wake-free. If the second wind power installation is in the wake of the first wind power installation, this state is referred to as wake-loaded.

The first wind power installation is operated in the substantially wake-free normal mode with a first pitch characteristic. If the second wind power installation is wake-loaded, i.e., is in the wake of the first wind power installation, the first wind power installation is operated in the wake mode with a second pitch characteristic.

The first pitch characteristic represents a first profile of the pitch angle as a function of the electrical power. Preferably, the pitch characteristic comprises a defined pitch angle for each value of the electrical power. Analogously, the second pitch characteristic represents a second profile of the pitch angle as a function of the electrical power. The second pitch characteristic, in analogy to the first pitch characteristic, thus assigns a defined pitch angle to each electrical power. This assignment is preferably specified for a defined range of the electrical power, in particular for each electrical power that can occur during operation of the wind power installation, for example between 0 killowatt (kW) and the rated power.

Preferably, the first pitch characteristic and the second pitch characteristic substantially match up to a first power threshold value of the electrical power and, for an electrical power exceeding the first power threshold value, the pitch angle of the second pitch characteristic is greater than the pitch angle of the first pitch characteristic.

Preferably therefore, the first pitch characteristic and the second pitch characteristic substantially match up to a first power threshold value of the electrical power. Matching means, in particular that, for a substantially arbitrary electrical power below the power threshold value, the pitch angle of the first pitch characteristic and the pitch angle of the second pitch characteristic are substantially the same. In other embodiments, the first pitch characteristic and the second pitch characteristic may also differ from each other in all ranges.

Substantially matching means in particular that, for a defined electrical power, the mutual deviation of the pitch angle of the first and the second pitch characteristic is at least less than 30%, and may be less than 20% or less than 10%. This is in contrast to the practice currently used at some wind farms, which usually provides that the pitch angle is significantly increased overall in the wake-loaded wake mode in order to reduce the turbulence-induced loads. For example, the pitch angle is set overall to 5°, 6° or 6.5° and/or increased by more than 2°, 3° or 4°. However, this unnecessarily reduces the power output of the wind power installation, and thus the power output of the wind farm, in the range below the first power threshold value.

Furthermore, it is accordingly preferably provided that, when the electrical power of the first wind power installation exceeds the first power threshold value, the pitch angle of the second pitch characteristic is greater than the pitch angle of the first pitch characteristic. This means that for a certain electrical power greater than the first power threshold value, the pitch angle in the wake-loaded wake mode is greater than the pitch angle to be set in the wake-free normal mode. If, for example, the second wind power installation is substantially not wake-loaded, the first wind power installation is operated with the first pitch characteristic. For example, in this case a pitch angle of 2° may be set in the case of a power of 1500 kW, although this of course depends on the rated power of the wind power installation and other design parameters.

However, if the second wind power installation is in the wake of the first wind power installation, the first wind power installation is operated with the second pitch characteristic. In this case, for the same exemplary wind power installation, a pitch angle of approximately 4° would be set in the case of, for example, a power of 1500 kW. This shows that, for an electrical power exceeding the first power threshold value, the pitch angle of the second pitch characteristic is greater than the pitch angle of the first pitch characteristic.

It is thereby taken into account that, from a certain electrical power and/or from a certain wind speed, the turbulence induced by the first wind power installation upwind of the second wind power installation is so strong that the second wind power installation would have to be curtailed during regular operation of the first wind power installation. This is taken into account by the second pitch characteristic. In a range of low electrical power and/or low wind speed, such a curtailment is usually not necessary, since the turbulence occurring at the second wind power installation usually does not exceed a maximum permissible design turbulence.

A preferred embodiment variant of the method provides that, for an electrical power that is lower than the first power threshold value, the pitch angle of the first pitch characteristic and the pitch angle of the second pitch characteristic are substantially equal, and/or wherein the profile of the first pitch characteristic and/or the profile of the second pitch characteristic have substantially no slope until the first power threshold value is exceeded.

For example, the first pitch characteristic in the range below the first power threshold value defines a pitch angle of 2° for an electrical power of 500 kW. In this case, the second pitch characteristic would likewise have a pitch angle of 2° in the range below the first power threshold value for an electrical power of 500 kW.

A profile of the first pitch characteristic without an increase is characterized in particular by the fact that the pitch angle remains substantially constant even with increasing electrical power. For example, the pitch angle may be 2°. The same applies substantially to the second pitch characteristic.

According to a further preferred embodiment variant of the method, it is provided that the first and/or the second wind power installation has a wind-speed-dependent maximum permissible thrust coefficient, wherein the pitch angle of the second pitch characteristic has a profile such that a thrust coefficient occurring at the wind power installation substantially does not exceed the maximum permissible thrust coefficient. This maximum thrust coefficient may ensue, for example, from a wake-loaded turbulence intensity. In other words, the second pitch characteristic has a profile such that the thrust coefficient exerted by the upwind wind power installation does not exceed a maximum thrust coefficient resulting from a limitation of the turbulence intensity of a downwind, and thus wake-loaded, wind power installation.

Furthermore, it is preferred that the first wind power installation has a wind-speed-dependent maximum permissible turbulence intensity, wherein the pitch angle of the second pitch characteristic has a profile such that a turbulence intensity occurring at the wind power installation substantially does not exceed the maximum permissible turbulence intensity.

The maximum permissible turbulence intensity $TI_{max}$ is specified in IEC standard 61400-1:

$$TI_{max} = TI_{WK} * \frac{0.75 * v + 5.6}{v}$$

$TI_{WK}$ depends on the wind class, which is divided into classes A, B, and C. $TI_{WK}$ may be, for example, 0.12, 0.14 and 0.16. For a wake-loaded wind power installation, the velocity v must be calculated using wake models, such as those by Jensen, Qian, Porte-Agel. These wake models usually require the thrust coefficient of the upwind installation, which can be calculated using, for example, blade element momentum (BEM) theory. Therefore, it is usually set as a boundary condition for maximising the electrical power of the wind farm that the turbulence applied to the wake-loaded wind power installation is less than a maximum permissible turbulence $TI_{max}$.

The turbulence-related constraint is equivalent to the thrust coefficient of a wake-loaded wind power installation being less than a maximum permissible thrust coefficient. Depending on the model, further variables must be taken into account for the evaluation, for example, the tip-speed ratio may be included in the inequality.

A preferred further development of the method is characterized in that, for an electrical power exceeding the first power threshold value, which is smaller than a second power threshold value, the pitch angle of the first pitch characteristic is substantially constant, and the pitch angle of the second pitch characteristic increases, preferably increases continuously, particularly preferably increases linearly, with other profiles also being possible.

Thus, between the first power threshold value and the second power threshold value, the pitch angle of the first pitch characteristic is substantially constant regardless of the electrical power. Between the first power threshold value and the second power threshold value, the pitch angle of the second pitch characteristic increases with increasing electrical power.

Another preferred further development of the method is characterized in that, for an electrical power exceeding the second power threshold value, the first pitch characteristic has a positive slope, which is preferably less than the slope of the second pitch characteristic.

In this preferred further development, the second pitch characteristic preferably has a first constant portion of the pitch angle below the first power threshold value, a rising portion between the first power threshold value and the third power threshold value, and again a constant portion from the third power threshold value, with other profiles also being advantageous.

It is further preferred that, for an electrical power exceeding a third power threshold value, which is greater than the first power threshold value, the pitch angle of the second pitch characteristic is substantially constant, and preferably assumes a value of between 4°-8°, in particular between 6°-7°.

Moreover, it is preferred that the first power threshold value is between 70% and 80% of the rated power of the first wind power installation.

Power threshold values can be recognised, in particular, by a kink in the pitch-angle power characteristic.

According to a further aspect, provided is a controller for operating a first wind power installation comprising a rotor having a rotor blade that is adjustable with a pitch angle, which generates an electrical power and in the wake of which a second wind power installation is located in at least one wake wind direction, wherein the controller is configured to operate the first wind power installation in a substantially wake-free normal mode with a first pitch characteristic and in a wake-loaded wake mode with a second pitch characteristic, wherein the first pitch characteristic represents a first profile of the pitch angle and the second pitch characteristic represents a second profile of the pitch angle as a function of the electrical power, wherein the pitch angle of the second pitch characteristic is greater than the pitch angle of the first pitch characteristic for at least one range of the electrical power.

According to a further aspect, provided is a wind farm comprising a first wind power installation comprising a rotor having a rotor blade that is adjustable with a pitch angle, which generates an electrical power and in the wake of which a second wind power installation is located in at least one wake wind direction, wherein the wind farm is designed to execute a method according to any one of the above-mentioned embodiment variants, and/or comprising a controller according to the previous aspect.

For further advantages, embodiment variants and embodiment details of the further aspects and their possible further developments, reference is also made to the previous description relating to the corresponding features and further developments of the method for operating a first wind power installation.

BRIEF DESCRIPTION OF THE SEVERAL VIEWS OF THE DRAWINGS

Preferred exemplary embodiments are explained exemplarily on the basis of the accompanying figures. There are shown.

In the figures, identical or substantially functionally identical or similar elements are denoted by the same references.

DETAILED DESCRIPTION

Figure 1:
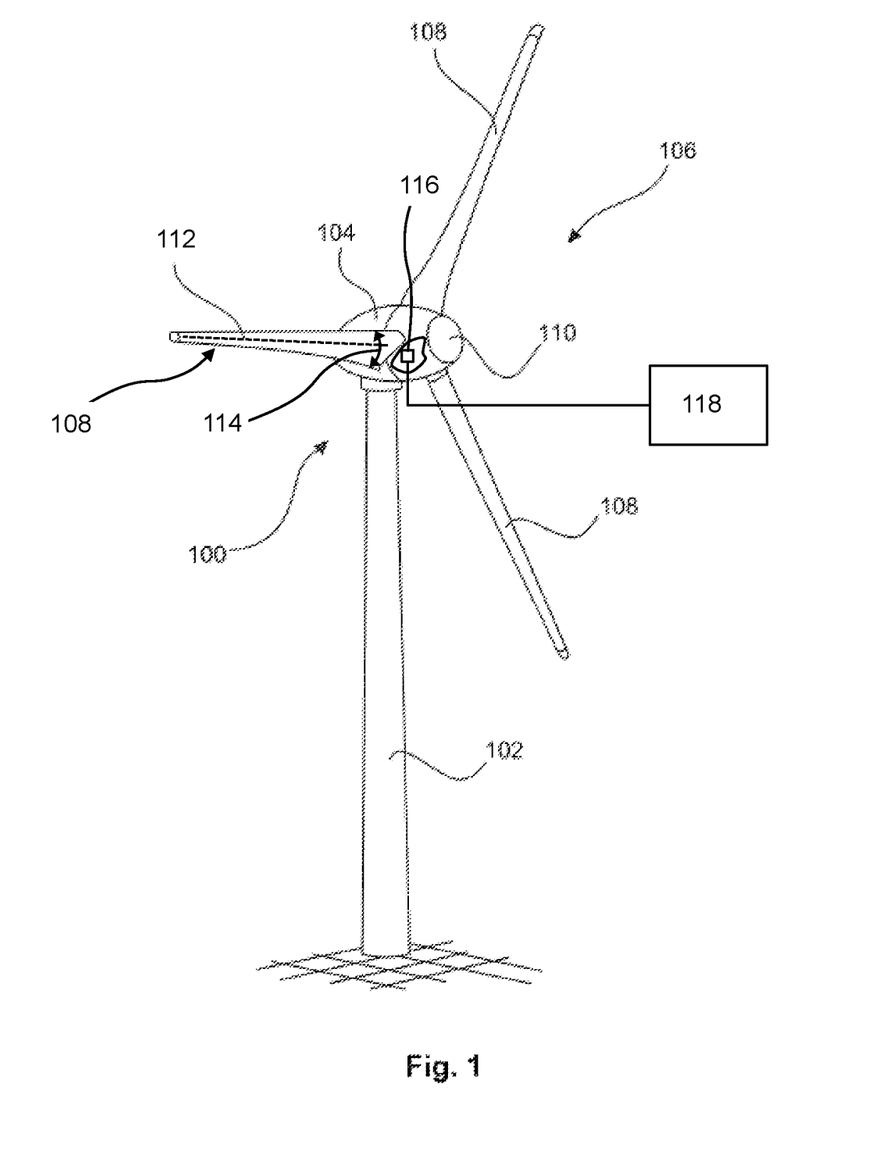
FIG. 1 is a schematic three-dimensional view of an exemplary embodiment of a wind power installation.

FIG. 1 shows a schematic representation of a wind power installation 100. The wind power installation 100 comprises a tower 102 and a nacelle 104 on the tower 102. An aerodynamic rotor 106 that has three rotor blades 108 and a spinner 110 is provided on the nacelle 104.

When wind power installation is in operation, the aerodynamic rotor 106 is put into a rotary motion by the wind and thus also rotates an electrodynamic rotor or generator rotor, which is directly or indirectly coupled to the aerodynamic rotor 106. The electrical generator is located in the nacelle 104 and generates electrical energy. The pitch angles 114 of the rotor blades 108 can be varied by pitch drives 116 at the rotor blade roots of the respective rotor blades 108.

Figure 2:
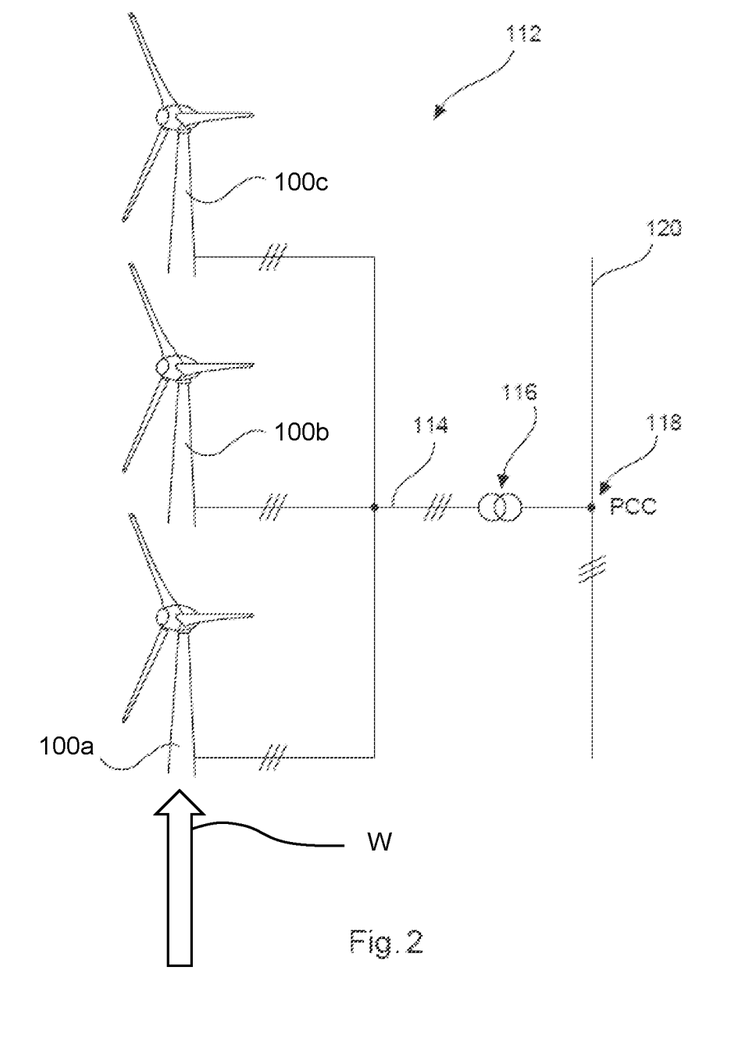
FIG. 2 is a schematic view of an exemplary embodiment of a wind farm.

The wind power installation 100 further comprises a controller 118 that is configured to operate the wind power installation 100 in a substantially wake-free normal mode with a first pitch characteristic and in a wake-loaded wake mode with a second pitch characteristic. The first pitch characteristic represents a first profile of the pitch angle and the second pitch characteristic represents a second profile of the pitch angle as a function of electrical power. The first pitch characteristic and the second pitch characteristic substantially match up to a first power threshold value of the electrical power. For an electrical power exceeding the first power threshold value, the pitch angle of the second pitch characteristic is larger than the pitch angle of the first pitch characteristic. FIG. 2 shows a schematic view of an exemplary embodiment of a wind farm 112.

FIG. 2 shows the wind farm 112 with, exemplarily, three wind power installations 100a, 100b, 100c. The three wind power installations 100a, 100b, 100c are representative of basically any number of wind power installations of the wind farm 112. The wind power installations 100a, 100b, 100c provide their electrical power, namely in particular the generated electricity, via an electrical wind-farm network 114. The respective generated currents, or power outputs, of the individual wind power installations 100a, 100b, 100c are added up, and in most cases a transformer 116 is provided, which transforms the voltage in the farm upwards in order to feed it into the supply network 120 at the feed-in point 118, which is also generally referred to as a PCC. FIG. 2 is merely a simplified representation of a wind farm 112. For example, the wind farm network 114 can be configured differently, for example by also having a transformer at the output of each wind power installation 100a, 100b, 100c.

In the case of the indicated wind direction W, the wind power installation 100b is located in the wake of the wind power installation 100a. In this case, the wind power installation 100a is located upwind of the wind power installation 100b. The wind power installation 100a is preferably operated, at least temporarily, in a wake-loaded wake mode, in which the wind power installation 100b is located in the wake of the wind power installation 100a. This means, in particular, that a second pitch characteristic is provided for this mode. In the case of the wind direction W, the wind power installation 100c is likewise located in the wake of the wind power installations 100a and 100b.

Without limitation of generality, the wind power installation 100a is also referred to in the following as the first wind power installation 100a, and the wind power installation 100b is also referred to as the second wind power installation 100b.

Figure 3:
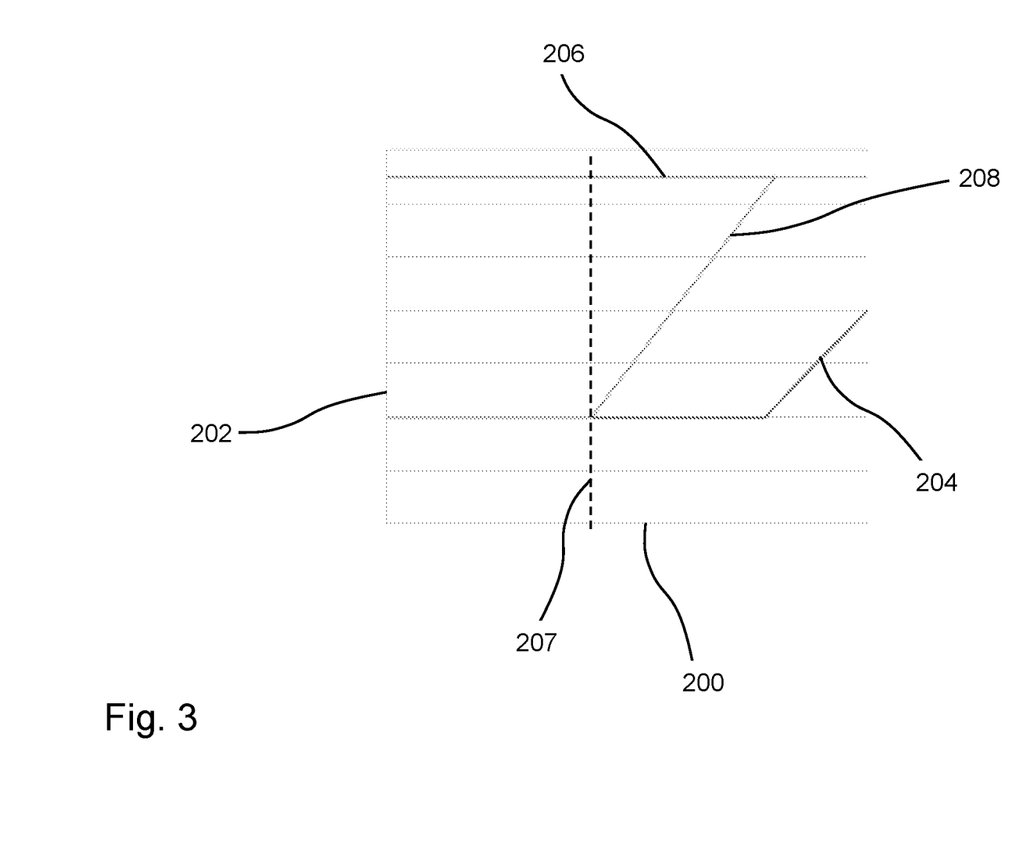
FIG. 3 is schematic profiles of pitch characteristics.

FIG. 3 shows schematic profiles of pitch characteristics. The electric power 200 of the foremost wind power installation, i.e., the one not in wake, is plotted on the abscissa. A pitch angle 202 of the wind power installation 100a is plotted on the ordinate. The first pitch characteristic is used for the wind power installation 100a when it is in wake-free normal mode, i.e., no wind power installation of the wind power installations 100b, 100c is in the wake of the wind power installation 100a, depending on the wind direction. The first wind power installation 100a is therefore in wake-free normal mode, in particular, when the wind is blowing from a wind direction that is different from the wind direction shown in FIG. 2W.

Also provided in FIG. 3 is a conventional pitch characteristic 206 for a wake-loaded wake mode. This conventional pitch characteristic 206 provides that, as soon as a wind power installation is in the wake of another wind power installation, the pitch angle is set to a higher value overall in order to reduce the thrust coefficients.

Figure 4:
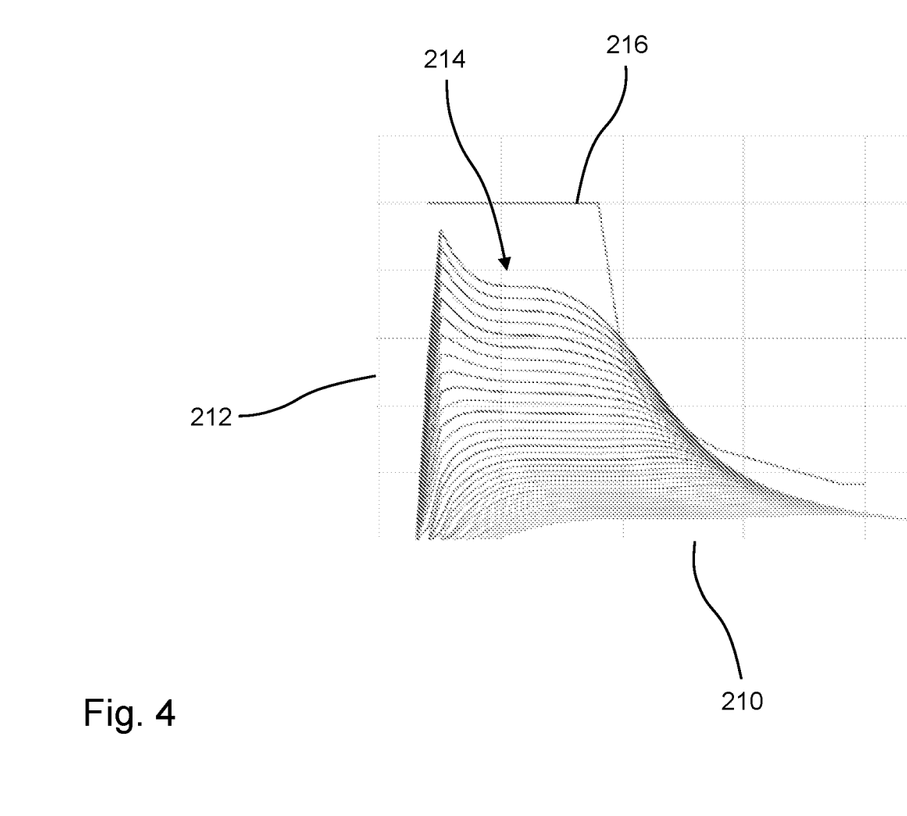
FIG. 4 is schematic profiles of thrust coefficients.

This effect of an increased pitch angle and the resulting reduction of the thrust coefficient can be seen in particular in FIG. 4. Shown on the ordinate in FIG. 4 is a profile of an undisturbed wind speed 210, for example in metres per second, plotted against a thrust coefficient 212 on the abscissa for various pitch angle profiles. The pitch angle profiles shown below in the diagram of FIG. 4, which is described in more detail below, represent such profiles for greater pitch angles. In particular, it can be seen in FIG. 4 that the greater the pitch angle, the smaller the thrust coefficient.

As an alternative to the conventional pitch characteristic 206, FIG. 3 shows the second pitch characteristic 208, which substantially corresponds to a first pitch characteristic 204 up to a first power threshold value 207 of the electrical power 200. For an electrical power 200 exceeding the first power threshold value 207, the pitch angle 202 of the second pitch characteristic 208 is greater than the pitch angle 202 of the first pitch characteristic 204.

The first pitch characteristic 204 may be, for example, a typical pitch characteristic that in any case specifies an increasing pitch angle from the attainment of the nominal power. In other cases, however, both the first pitch characteristic 204 and the second pitch characteristic 208 may provide, for example, for an increase in the pitch angle in the partial load range. For example, a linear increase up to the attainment of the rated power, and a non-linear increase from attainment of the rated power, may be provided.

The second pitch characteristic with which the first wind power installation 100a is operated results, in the wake-loaded wake mode of the wind power installation 100b, in a high electrical power being able to be generated in the partial load range below the first power threshold value 207, since here the thrust values are usually low, or higher thrust coefficients are permitted here. In the case of an electrical power, and thus usually also a corresponding wind speed, that exceeds the first power threshold value 207, the pitch angle of the second pitch characteristic 208 is increased in order to reduce the thrust coefficients. In this way, for example, a still existing thrust reserve, i.e., up to the maximum permissible loads, of the wind power installation 100b in the wake can be utilised, which in turn increases the yield of the wind power installation 100b.

FIG. 4 shows schematic profiles of thrust coefficients. The wind speed 210 is plotted on the abscissa, for example in metres per second. The thrust coefficient 212 is plotted on the ordinate. The profile of the maximum permissible thrust coefficient 216 is also plotted. Here it can be seen that, up to a certain wind speed 210, the maximum thrust coefficient 216 is always greater than it is for certain pitch values. This means that, in this low wind speed range, an almost arbitrary pitch angle can be set, irrespective of a maximum permissible thrust coefficient, such that the focus can be placed almost exclusively on generating maximum electrical power. With increasing wind speed, however, a thrust coefficient set by a pitch angle that would be optimal in respect of power can exceed the maximum thrust coefficient 216. In this case, the pitch angle must be adjusted accordingly, such that the resulting thrust coefficient does not substantially exceed the maximum thrust coefficient.

Figure 5:
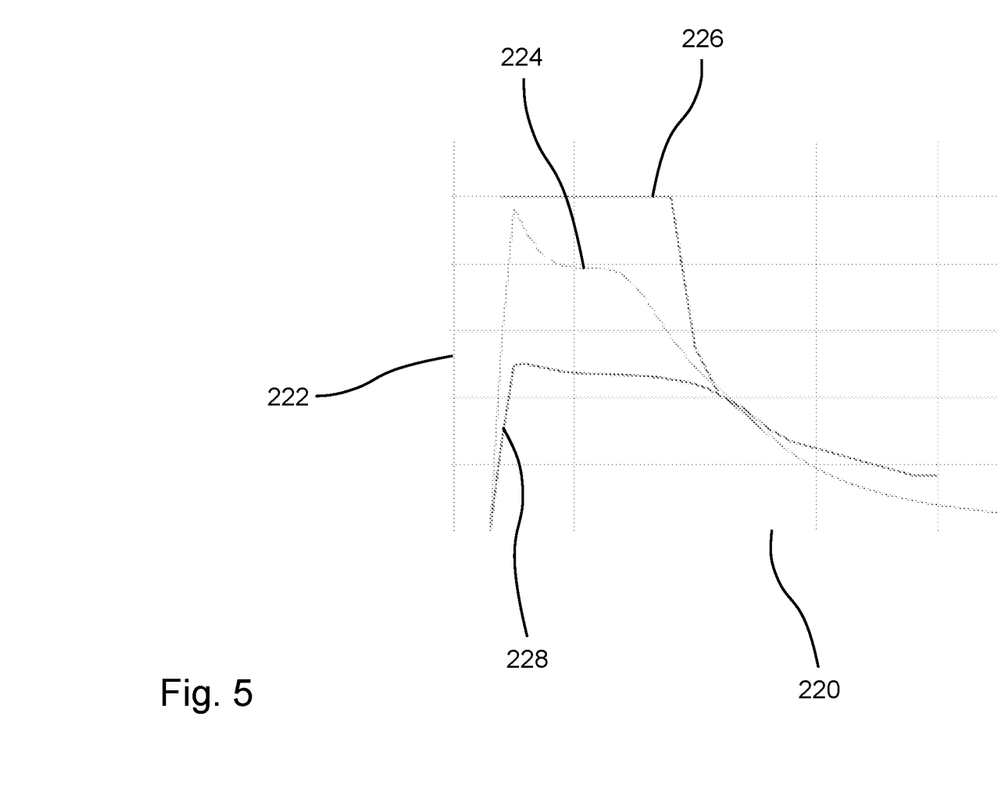
FIG. 5 is schematic profiles of thrust coefficients.

FIG. 5 shows selected profiles of thrust coefficients from FIG. 4. The wind speed is plotted on the abscissa, for example in metres per second, and the thrust coefficient 222 is plotted on the ordinate. The thrust coefficient curve 228 represents the thrust coefficient for a pitch angle corresponding to the pitch characteristic 206 of FIG. 3. The thrust coefficient curve 224 for the second pitch characteristic 208 shows that a higher thrust coefficient is always achieved in the partial load range. This usually results in the generation of greater electrical power. The thrust coefficient curve 224 for the second pitch characteristic 208 is closer to the curve of the maximum permissible thrust coefficient 226, especially in the partial load range.

Figure 6:
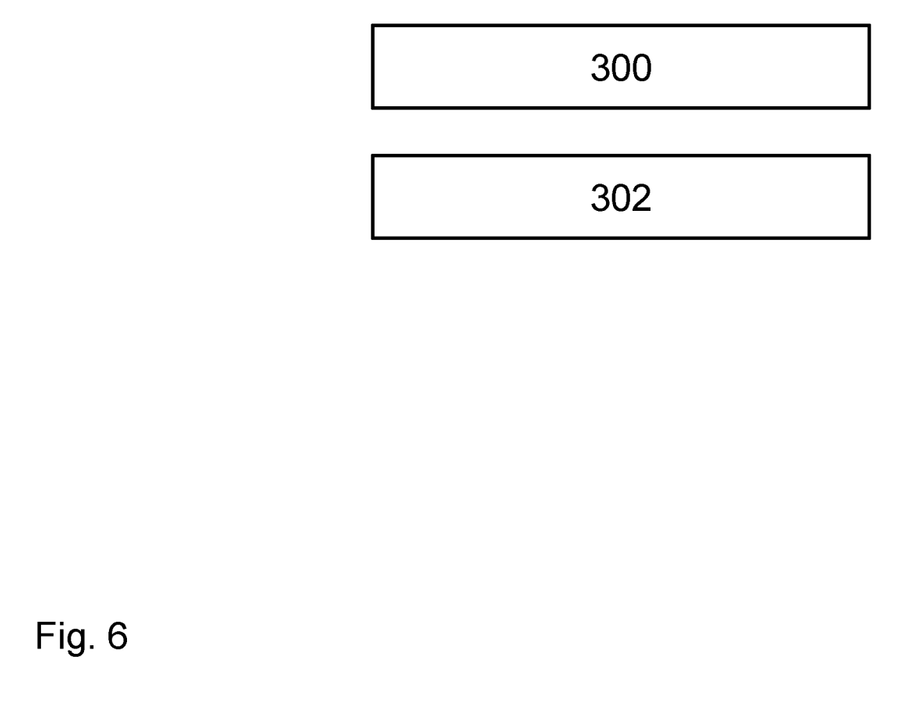
FIG. 6 is a schematic method.

FIG. 6 shows a schematic method. In step 300, a first wind power installation 100a and a second wind power installation 100b are each operated in a wake-free normal mode with the first pitch characteristic 204. Here, therefore, none of the wind power installations 100a, 100b is in the shadow of another wind power installation. In particular, the wind power installation 100b is substantially not in shadow, i.e., in the wake of the wind power installation 100a. In step 302, if the wind now turns such that the wind power installation 100b is in the wake of the wind power installation 100a, the first wind power installation 100a is operated in a wake-loaded wake mode with a second pitch characteristic 208.

Thus, in step 302, the first wind power installation 100a is operated with the second pitch characteristic 208. The second pitch characteristic 208 represents a second profile of the pitch angle as a function of the electrical power, with the second pitch characteristic 208 preferably substantially matching the profile of the first pitch characteristic 204 up to a first power threshold value 207 of the electrical power, but when the first power threshold value 207 is exceeded, the pitch angle of the second pitch characteristic 208 is greater than the pitch angle of the first pitch characteristic 204.

REFERENCES 100a, 100b, 100c wind power installation
102 tower
104 nacelle
106 rotor
108 rotor blades
110 spinner
112 rotor-blade longitudinal axis
114 pitch angle
116 pitch drive
118 controller
200 electrical power
202 pitch angle
204 first pitch characteristic
206 conventional pitch characteristic
207 first power threshold value
208 second pitch characteristic
210 wind speed in m/s
212 thrust coefficient
214 thrust coefficient curve for a multiplicity of pitch angles
216 maximum permissible thrust coefficient
220 wind speed in m/s
222 thrust coefficient
224 thrust coefficient curve for second pitch characteristic 208
226 maximum permissible thrust coefficient
228 thrust coefficient curve for conventional pitch characteristic 206
W wind direction The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
operating a first wind power installation comprising a rotor having a rotor blade that is adjustable with a pitch angle, wherein the first wind power installation generates an electrical power, wherein a second wind power installation is located in a wake of the first wind power installation in at least one wake wind direction,
wherein operating the first wind power installation includes operating the first wind power installation in a wake-free normal mode with a first pitch characteristic, and operating the first wind power installation in a wake-loaded wake mode with a second pitch characteristic,
wherein the first pitch characteristic represents a first profile of the pitch angle and the second pitch characteristic represents a second profile of the pitch angle as a function of the generated electrical power, and
wherein the pitch angle of the second pitch characteristic is greater than the pitch angle of the first pitch characteristic for at least one range of the generated electrical power;
wherein the at least one range of the generated electrical power includes a first power threshold value, wherein the first pitch characteristic and the second pitch characteristic correspond up to the first power threshold value, and, for a generated electrical power exceeding the first power threshold value, the pitch angle of the second pitch characteristic is greater than the pitch angle of the first pitch characteristic.

2. The method according to claim 1, wherein, for a generated electrical power that is lower than the first power threshold value, the pitch angle of the first pitch characteristic and the pitch angle of the second pitch characteristic are equal to each other.

3. The method according to claim 1, wherein a profile of a pitch characteristic, chosen from the first pitch characteristic and the second pitch characteristic, have no slope until the first power threshold value is exceeded.

4. The method according to claim 1, wherein the first wind power installation has a wind-speed-dependent maximum permissible thrust coefficient, wherein the pitch angle of the second pitch characteristic has a profile as a function of the generated electrical power such that a thrust coefficient occurring at the second wind power installation does not exceed the maximum permissible thrust coefficient.

5. The method according to claim 1, wherein the first wind power installation has a wind-speed-dependent maximum permissible turbulence intensity, wherein the pitch angle of the second pitch characteristic has a profile as a function of the generated power such that a turbulence intensity occurring at the first wind power installation does not exceed the maximum permissible turbulence intensity.

6. The method according to claim 1, wherein the at least one range of the generated electrical power includes a second power threshold value that is larger than the first power threshold value and, for a generated electrical power between the first power threshold value and the second power threshold value, the pitch angle of the first pitch characteristic is constant as the generated electrical power changes, and the pitch angle of the second pitch characteristic increases as the generated electrical power increases.

7. The method according to claim 6, wherein the pitch angle of the second pitch characteristic increases continuously.

8. The method according to claim 7, wherein the pitch angle of the second pitch characteristic increases linearly.

9. The method according to claim 6, wherein, for a generated electrical power exceeding the second power threshold value, the first pitch characteristic has a positive slope with respect to the generated electrical power.

10. The method according to claim 9, wherein, the positive slope is less than a slope of the second pitch characteristic.

11. The method according to claim 1, wherein the at least one range of the generated electrical power includes a third power threshold value that is larger than the first power threshold value and, for a generated electrical power exceeding the third power threshold value, the pitch angle of the second pitch characteristic is constant as the generated electrical power changes.

12. The method according to claim 11, wherein the pitch angle of the second pitch characteristic is a value of between 4° and 8°.

13. The method according to claim 11, wherein the pitch angle of the second pitch characteristic is a value between 6° and 7°.

14. The method according to claim 1, wherein the first power threshold value is between 70% and 80% of a rated power of the first wind power installation.

15. A controller for operating a first wind power installation comprising a rotor having a rotor blade that is adjustable with a pitch angle, wherein the first wind power installation generates an electrical power and in a wake of the first wind power installation, a second wind power installation is located in at least one wake wind direction, wherein the controller is configured to:
- operate the first wind power installation in a wake-free normal mode with a first pitch characteristic and in a wake-loaded wake mode with a second pitch characteristic,
- wherein the first pitch characteristic represents a first profile of the pitch angle and the second pitch characteristic represents a second profile of the pitch angle as a function of the generated electrical power,
- wherein the pitch angle of the second pitch characteristic is greater than the pitch angle of the first pitch characteristic for at least one range of the generated electrical power;
- wherein the at least one range of the generated electrical power includes a first power threshold value, wherein the first pitch characteristic and the second pitch characteristic correspond up to the first power threshold value, and, for a generated electrical power exceeding the first power threshold value, the pitch angle of the second pitch characteristic is greater than the pitch angle of the first pitch characteristic.

16. A wind farm comprising:
the controller according to claim 15, and
a plurality of wind power installations that include the first wind power installation and the second wind power installation.

* * * * *